(12) United States Patent
Raman et al.

(10) Patent No.: US 9,076,016 B2
(45) Date of Patent: Jul. 7, 2015

(54) ANONYMIZATION AS A SERVICE (75) Inventors: Madhusudan Raman, Sherborn, MA (US); Peter Steven Tippett, Great Falls, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 229 days.

(21) Appl. No.: 13/589,239

(22) Filed: Aug. 20, 2012

(65) Prior Publication Data
US 2014/0053244 A1    Feb. 20, 2014

(51) Int. Cl.
*H04L 29/00* (2006.01)
*G06F 21/62* (2013.01)

(52) U.S. Cl.
CPC .................................. *G06F 21/6263* (2013.01)

(58) Field of Classification Search
CPC ..................................................... G06F 21/6263
See application file for complete search history.

(56) References Cited

U.S. PATENT DOCUMENTS

2007/0143860 A1* 6/2007 Hardt ............................... 726/28
2007/0220591 A1* 9/2007 Damodaran et al. ............... 726/4

* cited by examiner

*Primary Examiner* — Brandon Hoffman
*Assistant Examiner* — Helai Salehi (57) ABSTRACT

One or more network devices receive user criteria for providing anonymization of data from a user device and generate a default workflow for achieving the user criteria. The network devices provide, to the user device, the default workflow and receive user input to the default workflow. The network devices generate and send, based on the user input, final workflow instructions for transmitting data from the user device. The network devices also receive anonymized data transmitted from the user device based on the final workflow instructions. The network devices can provide trend observations of the anonymized data for use by third parties without granting access to the anonymized data.

19 Claims, 9 Drawing Sheets

ANONYMIZATION AS A SERVICE

BACKGROUND

Electronic transactions typically include data that enables identification of an originating source. Privacy concerns and/or government regulations require particular standards to enforce the security and privacy of certain types of data. For example, provisions may restrict use of health data in compilations if the health data can be associated with particular individuals.

DETAILED DESCRIPTION OF PREFERRED EMBODIMENTS

The following detailed description refers to the accompanying drawings. The same reference numbers in different drawings may identify the same or similar elements.

Systems and/or methods provided herein may allow the user of anonymization as both an input service and an output service. The systems and/or methods may support device users who generate data requesting anonymization or consumption-side third parties that make requests for anonymized trend information.

In one implementation, a user device may provide eligibility information and anonymization criteria via a setup program resident on the user device. The systems and/or methods may include returning to the user device an instruction set with a workflow for performing anonymized data transfers in accordance with the provided criteria. The systems and/or methods may receive a request to conduct an anonymized data transfer that includes the eligibility information. The systems and/or methods may approve the request, and may transfer the request to another network device for receipt of the anonymized data via the workflow.

As used herein, the terms "anonymize," "anonymized," and "anonymization" may refer to concepts of obfuscating an origin or identity associated with data transmitted from a device. However, these terms are not limited in scope to techniques that provide perfect identity masking. Anonymization and data de-identification are NP-Hard (non-deterministic polynomial-time hard) problems in computer science. It should be understood that, given time and resources, de-identified data generally may be re-identified by adding other external data elements.

Figure 1:
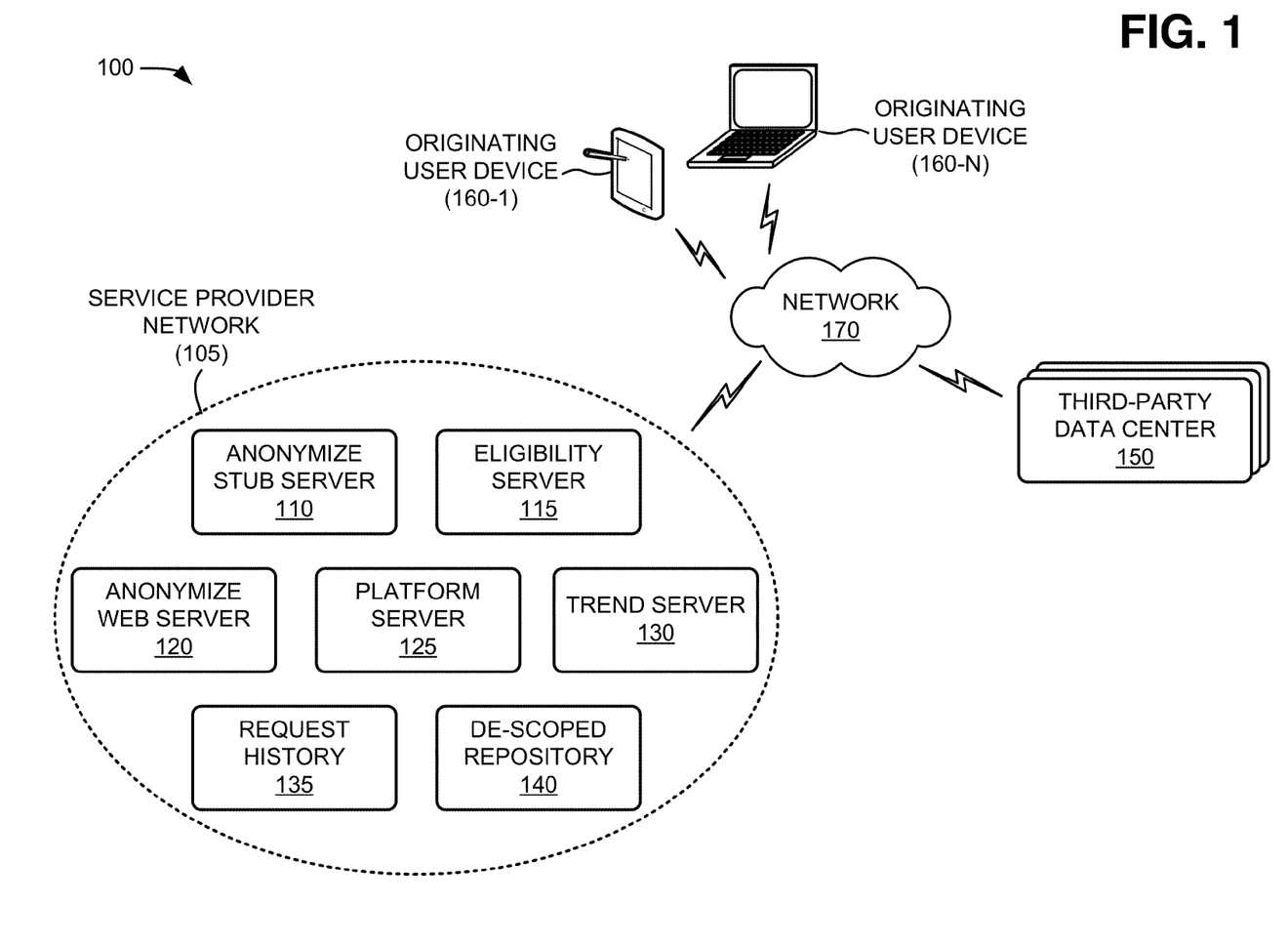
FIG. 1 is a diagram illustrating an exemplary network in which systems and/or methods described herein may be implemented.

FIG. 1 is an exemplary network 100 in which systems and/or methods described herein may be implemented. As illustrated, network 100 may include a service provider network 105 that includes an anonymize stub server 110, an eligibility server 115, an anonymize web server 120, a platform server 125, a trend server 130, a request history server 135, and a de-scoped repository 140; a third party data center 150; and originating user devices 160-1 through 160-N (collectively "user devices 160" and individually "user device 160"), interconnected by a network 170. Components of network 100 may be connected via wired and/or wireless links.

Service provider network 105 may include network devices to provide anonymization services to subscribers. Service provider network 105 may also manage data collection for data compilations available to third party data center 150. Service provider network 105 may include, for example, one or more private IP networks that use a private IP address space. Service provider network 105 may include a local area network (LAN), an intranet, a private wide area network (WAN), etc. In one implementation, service provider network 105 may implement one or more Virtual Private Networks (VPNs) for providing communication between, for example, any of anonymize stub server 110, eligibility server 115, anonymize web server 120, platform server 125, trend server 130, request history server 135, and de-scoped repository 140. Service provider network 105 may be protected/separated from other networks, such as network 170, by a firewall. Although shown as a single element in FIG. 1, service provider network 105 may include a number of separate networks.

Anonymize stub server 110 may provide an interface between backend systems and user device 160. In one implementation, anonymize stub server 110 may include a library of code used for receiving and executing commands from a stub client (e.g., residing on user device 160). Anonymize stub server 110 may provide an initial interface to user devices 160 attempting to access anonymization services available through service provider network 105. Anonymize stub server 110 may, for example, direct service requests from user devices 160 to eligibility server 115 and/or anonymize web server 120. In one implementation, the interactions between anonymize stub server 110 and user device 160 may be performed using hypertext transfer protocol (HTTP) or secure HTTP (HTTPS) via network 170.

Eligibility server 115 may provide a backend support for authorizing use of anonymization services by user devices 160. For example, eligibility server 115 may store identification information for registered user devices 160 to verify that a particular user device has access to anonymization services provided by service provider network 105. Upon verifying eligibility of a device, eligibility server 115 may, for example, provide a link (e.g., a URL) to permit user device 160 to access other devices in service provider network 105 to conduct an anonymized data transfer.

Anonymize web server 120 may manage anonymization requests from eligible user devices 160. In one implementation, as described further herein, anonymize web server 120 may receive anonymization requests and may forward anonymized data from user device 160 to platform server 125 for processing.

Platform server 125 may request and obtain information that will be associated with an eligible user device 160 and configure an anonymization profile for user device 160. Platform server 125 may receive user criteria for providing anonymization and may generate (e.g., based on the user criteria) a default workflow (e.g., for routing through multiple anonymize proxy devices) to achieve the user criteria. Platform server 125 may provide, to user device 160 (e.g., via anonymize web server 120) the default workflow. Platform server 125 may also receive user input/modification to the default workflow and may generate (e.g., based on the user input) final workflow instructions for use by user device 160 in subsequent anonymized data transfers. When user device 160 sends anonymized data (e.g., using the final work flow instructions), platform server 125 may receive the data and may calculate a reconstruction risk score and/or a relative level of anonymity for the data transmitted from user device 160. The reconstruction risk score and/or a relative level of anonymity may be provided to user device 160 as user feedback.

Trend server 130 may collect and collate cumulative anonymized data generated by user devices 160. Trend server 130 may, for example, receive data from individual anonymous transactions and store the data with data from other anonymous transactions (e.g., from other user devices 160) in de-scoped repository 140. Trend server 130 may apply one or more algorithms to detect cumulative trends that may be provided to third parties (e.g., third party data center 150) without association to particular users/user devices. Cumulative trends may be presented, for example, as a Predictive Model Markup Language (PMML) model and/or situational real-time scoring.

Request history server 135 may maintain a repository of anonymization requests from user devices 160. The repository of anonymization requests may generally be configured as sacrosanct data (e.g., generally not accessible but to the highest levels of security). However, request history server 135 may retrieve historical records from the repository if, for example, reconstruction of an anonymous transaction is required (e.g., for law enforcement, safety purposes, etc.).

De-scoped repository 140 may include a database or another data structure to store anonymized data that may be used for trend observations (e.g., by trend sever 130). In one implementation, de-scoped repository 140 may be certified for anonymity levels to meet privacy regulations (e.g., Health Insurance Portability and Accountability Act of 1996 (HIPAA) regulations, etc.).

Third party data center 150 may include a device or group of devices associated with a third party that may desire to receive and/or utilize anonymized data from user devices 160. For example third party data center 150 may include computers or other communication devices to receive medical research data, gaming data, or other anonymized trend data. In one implementation, third party data center 150 may receive raw anonymized data. In another implementation, third party data center 150 may receive trend reports or other data compilations generated, for example, by trend server 130 without having access to underlying anonymized data.

User device 160 may include a computational or communication device. User device 160 may include, for example, a personal communications system (PCS) terminal (e.g., a smartphone that may combine a cellular radiotelephone with data processing and data communications capabilities), a tablet computer, a smartphone, a personal computer, a laptop computer, a gaming console, a global positioning system (GPS) device, a content recording device (e.g., a camera, a video camera, etc.), or other types of computation or communication devices. In another implementation, user device 160 may include a dedicated device for collecting and/or transmitting particular data, such as a phone-enabled glucose monitor.

User device 160 may be configured to collect user data, such as health/wellness data, gaming data, location data, or other data, that may be subject to privacy restrictions. For example, user device 160 may include an application or be connected to another device (not shown) that collects data about a user. User device 160 may also include communication capabilities to transmit collected information to remote devices (e.g., third party data center 150). In implementations described herein, user device 160 may be configured with an anonymize application to enable a user to configure criteria for anonymized data transfers and to selectively transmit data in accordance with the configured criteria. In one implementation, data collection applications may implement a standard application programming interface (API) to tie into the anonymize application.

Network 170 may include a local area network (LAN); an intranet; the Internet; a wide area network (WAN), such as a cellular network, a satellite network, a fiber optic network, a private WAN, or a combination of the Internet and a private WAN; etc., that is used to transport data. Although shown as a single element in FIG. 1, network 170 may include a number of separate networks that function to provide services to user devices 160.

In FIG. 1, the particular arrangement and number of components of network 100 are illustrated for simplicity. In practice there may be more service provider networks 105, anonymize stub servers 110, eligibility servers 115, anonymize web servers 120, platform servers 125, trend servers 130, request history servers 135, de-scoped repositories 140, third party data centers 150, originating user devices 160, and/or networks 170. For example, there may be hundreds or thousands of user devices 160.

Figure 2:
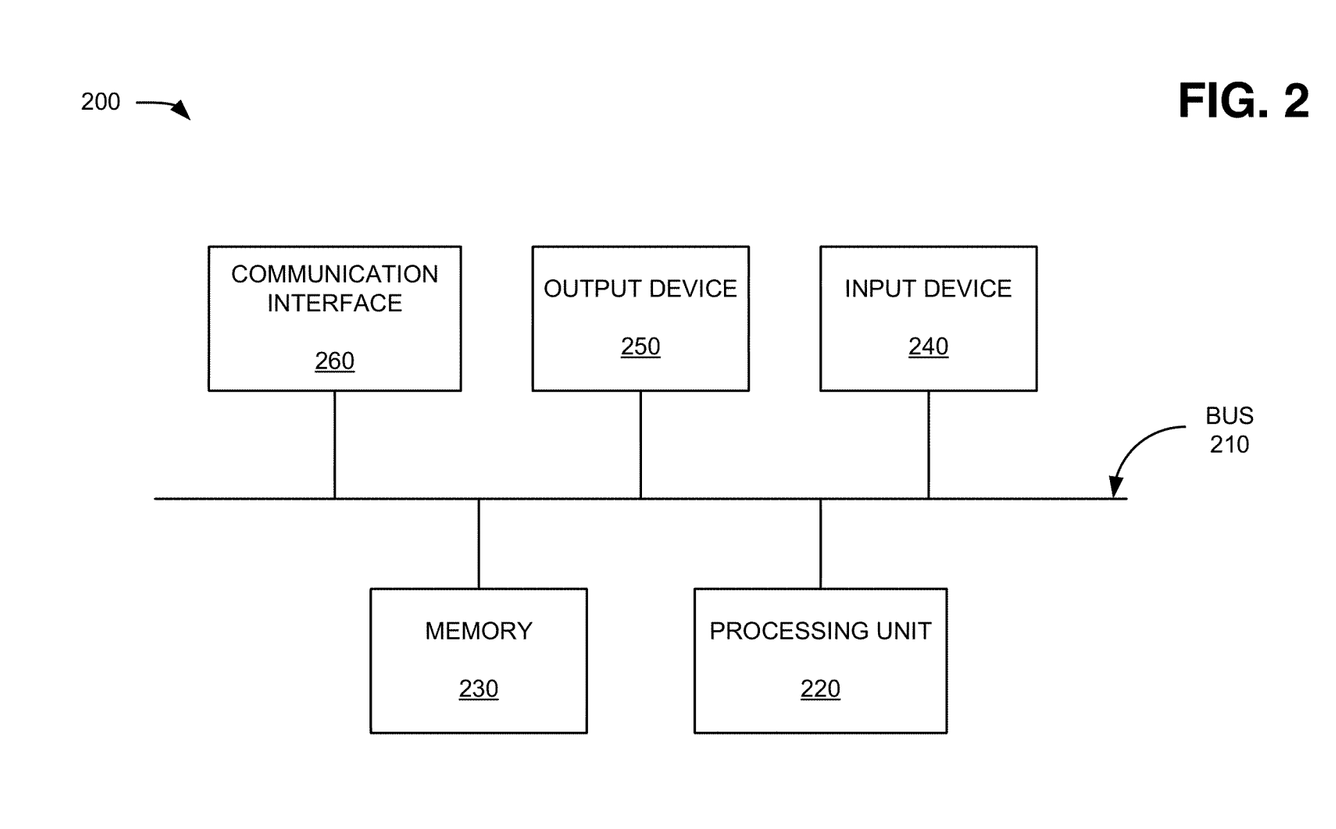
FIG. 2 is a block diagram of exemplary components of a device that may correspond to one of the devices of FIG. 1.

FIG. 2 is a diagram of exemplary components of a device 200. Each of anonymize stub server 110, eligibility server 115, anonymize web server 120, platform server 125, trend server 130, request history server 135, third party data center 150, and user device 160 may be implemented/installed as software, or a combination of hardware and software, on one or more of device 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may include a non-transitory memory device. A memory device may be implemented within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. As an example, in some implementations, a display may not be included in device 200. In these situations, device 200 may be a "headless" device that does not include input device 240. Alternatively, or additionally, one or more components of device 200 may perform one or more other tasks described as being performed by one or more other components of device 200.

Figure 3:
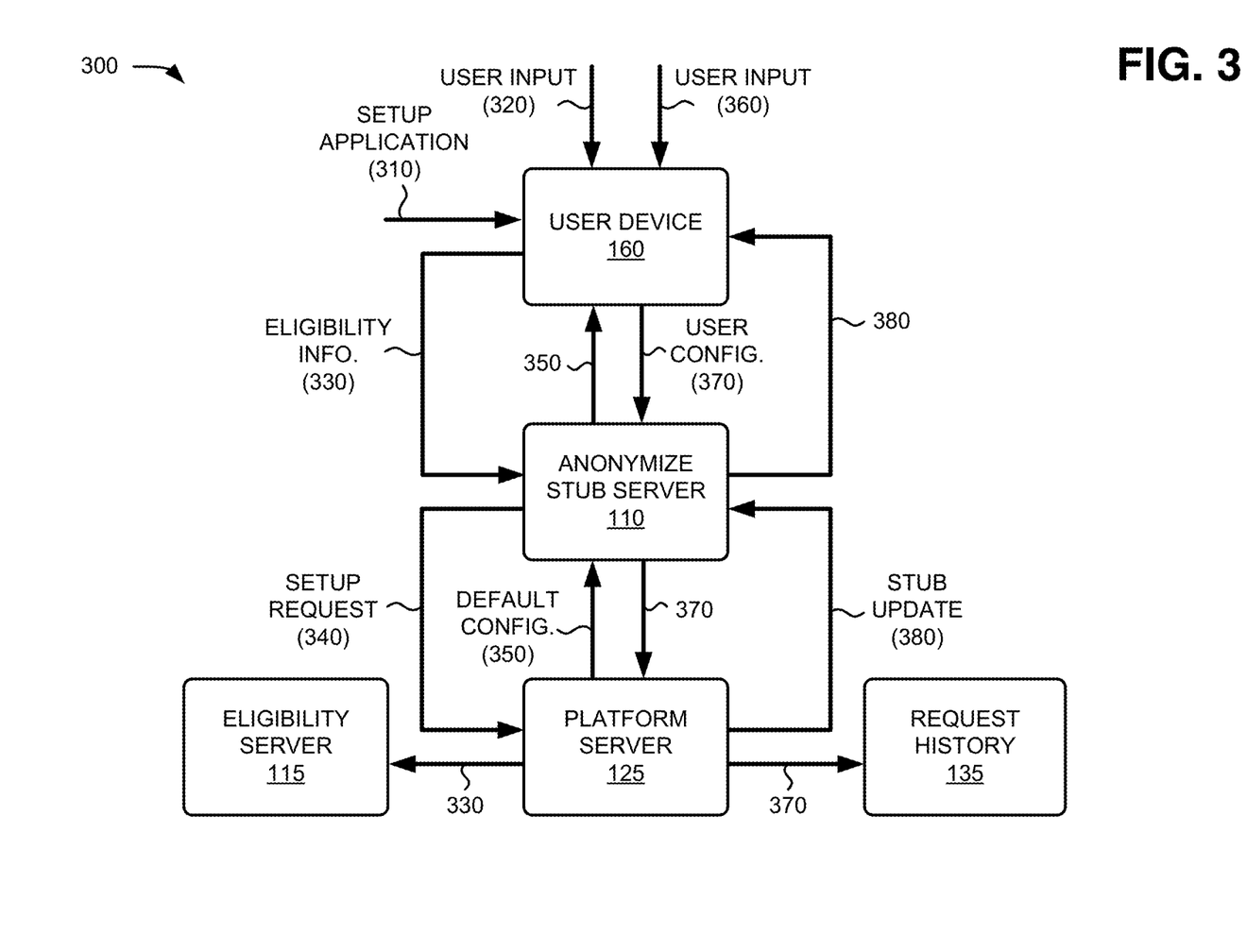
FIG. 3 is a diagram of exemplary communications between devices in a portion of the network of FIG. 1.

FIG. 3 is a diagram of exemplary communications for a portion 300 of network 100. Communications in FIG. 3 may represent communications to provide anonymized data from user device 160 to third party data center 150. As shown in FIG. 3, network portion 300 may include anonymize stub server 110, eligibility server 115, platform server 125, and user device 160. Anonymize stub server 110, eligibility server 115, platform server 125, and user device 160 may include features described above in connection with, for example, FIGS. 1 and 2.

Figure 4:
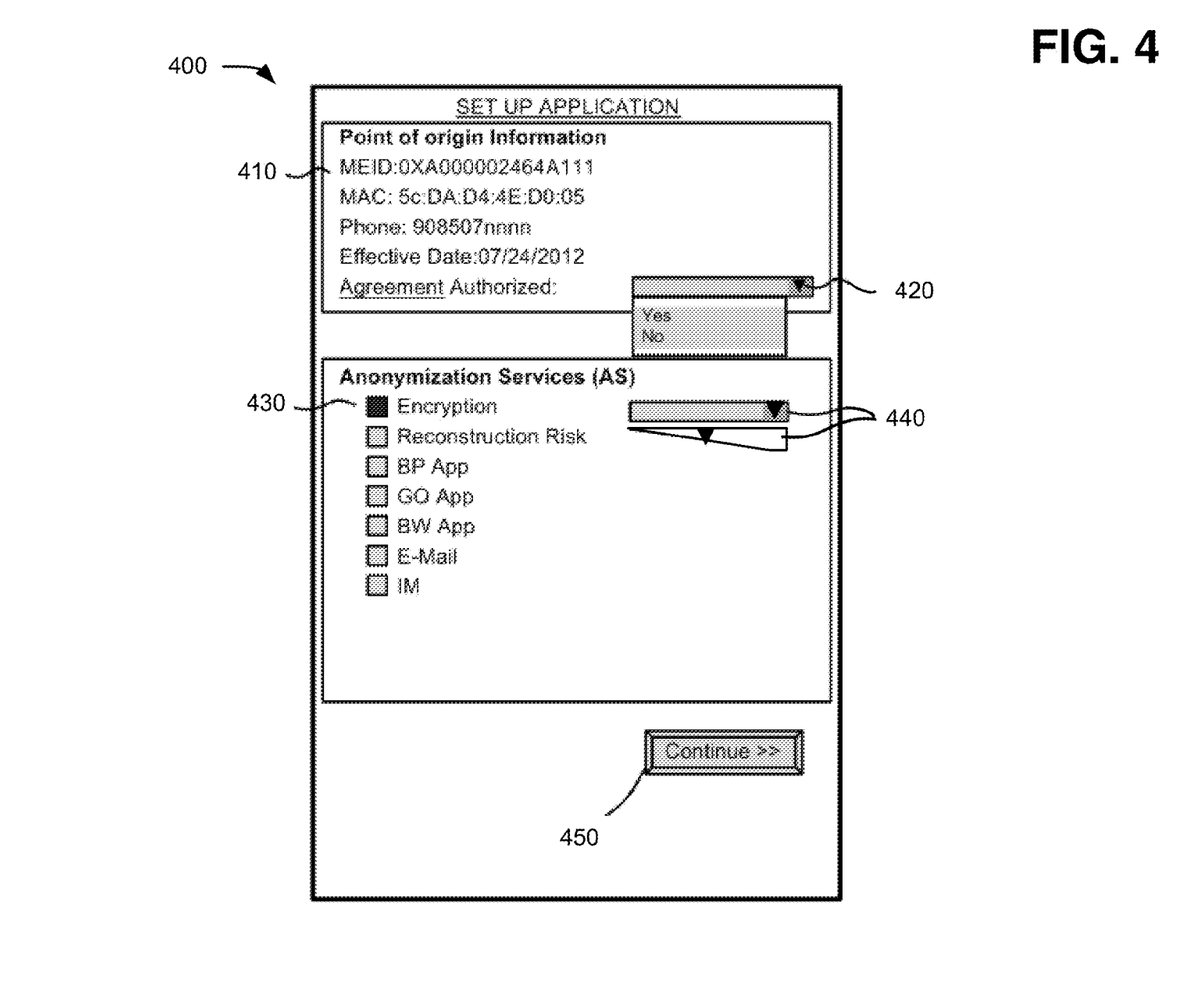
FIG. 4 is a diagram of an exemplary user interface that may be presented by the user device of FIG. 1.

As shown in FIG. 3, user device 160 may receive a setup application 310 to configure anonymous transactions. Setup application 310 may be received, for example, as part of a registration process with service provider network 105. User device 160 may register with service provider network 105 and may receive a setup application. The setup application may include a first setup user interface to solicit eligibility information for a user to use an anonymize interface with service provider network 105. FIG. 4 provides an exemplary user interface 400 that may correspond to the first setup user interface.

As shown in FIG. 4, user interface 400 may include a device information section 410, an end-user license agreement (EULA) confirmation section 420, and a default configuration section 430 that includes one or more variable input selectors 440. Device information section 410 may include automatically-generated information that is particular to user device 160, such as a mobile equipment identifier (MEID), a media access control (MAC) address, a phone number, and/or a date. The automatically generated information may be pulled, for example, from memory (e.g., memory 230) or network settings in user device 160. EULA confirmation section 420 may include, for example, a link to a EULA for the anonymization service and a user input section to accept or reject the EULA.

Still referring to FIG. 4, default configuration section 430 may include default configurations to be applied to anonymization services associated with user device 160. Default configurations may include encryption level settings and/or reconstruction risk level settings to be associated with anonymized data from one or more applications. The encryption level settings and/or reconstruction risk level settings may be indicated by user input into variable input selectors 440. For example, encryption level settings and/or reconstruction risk level settings may be selected collectively for a group of data-generating applications (e.g., a blood-pressure (BP) monitoring application, a glucose (GO) monitoring application, a body weight (BW) monitoring application, an email application, an instant message (IM) application, etc.). In another implementation, encryption level settings and/or reconstruction risk level settings may be assigned differently for each application.

In one implementation, selection of a particular data-generating application (e.g., BP App, GO App, BW App, E-Mail, IM, etc.) may indicate (e.g., to service provider network) a particular type of data and or user information associated with the particular data-generating application. Based on the type of data from an application, service provider network 105 may define categories into which anonymized data from user device 160 may be grouped (e.g., with data from other users). Categories may include, for example, demographic groups such as an age range, a regional location, a gender, etc. For example, selection of a body weight (BW) application may indicate data types to be categorized would include age, gender, weight, height, time of day, etc.

Selection of a continue option 450 may indicate that user inputs are complete and, when selected, continue option 450 may cause user device 160 to connect to service provider network 105. While certain eligibility and configuration information is provided in FIG. 4, in other implementations, user interface 400 may include different information, differently-arranged information, and/or additional information than depicted in FIG. 4.

Returning to FIG. 3, a user may provide user input 320 (e.g., via user interface 400) to submit eligibility information 330 to use the anonymization service on user device 160. Eligibility information 330 may include, for example, device identification information (e.g., from device information section 410) and license agreements (e.g., EULA confirmation section 420). Anonymize stub server 110 may receive eligibility information 330 and may submit a setup request 340 to platform server 125. Setup request 340 may include eligibility information 330 and other information to enable platform server 125 to determine a default workflow for anonymization services and enable eligibility server 115 to later determine if user device 160 is authorized to use the anonymization services.

Figure 5:
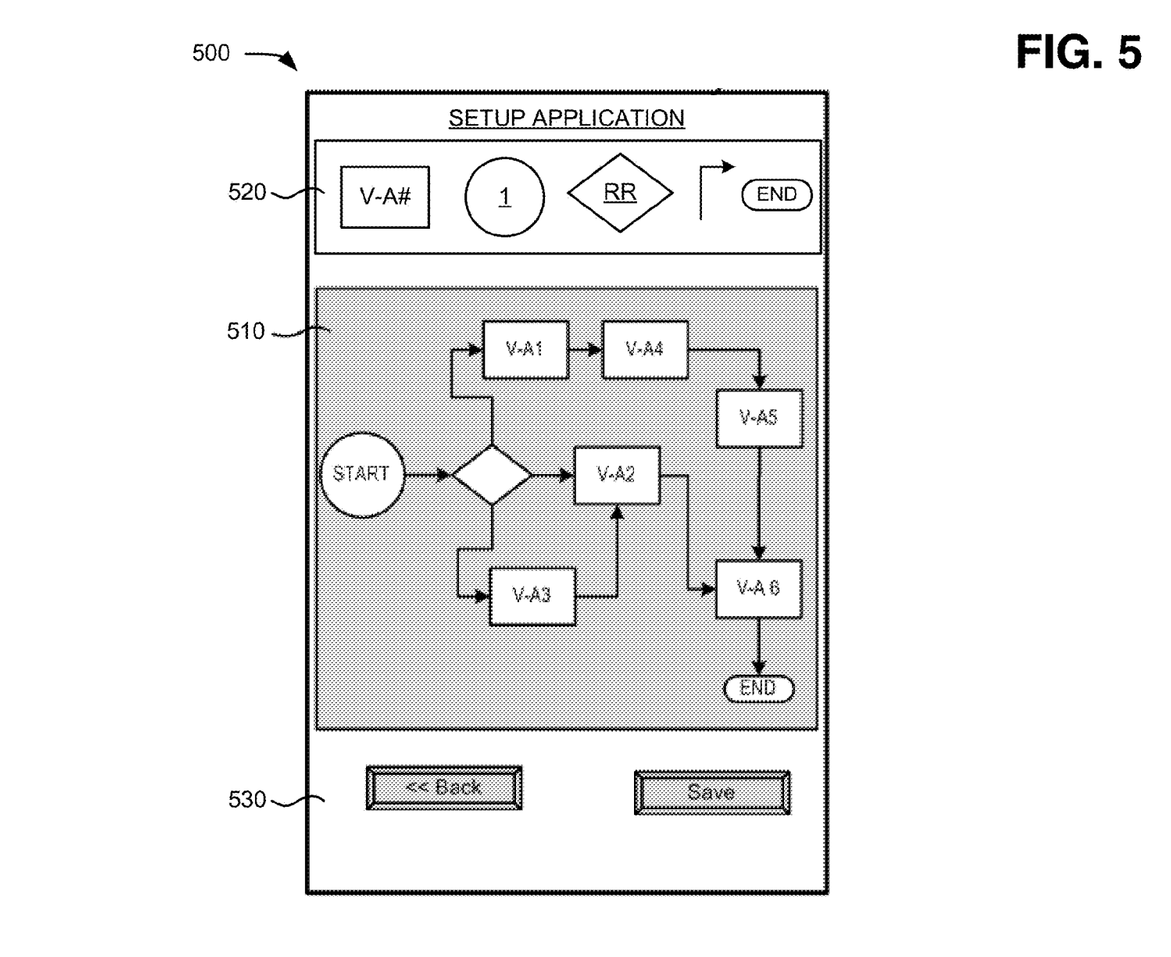
FIG. 5 is a diagram of another exemplary user interface that may be presented by the user device of FIG. 1.

In response to setup request 340, platform server 125 may identify a default workflow for anonymization services. The default workflow may include an anonymization path (e.g., via multiple proxy devices, not shown) and/or obfuscation steps to perform on particular types of data, as well as encryption/decryption schemes, categories for trends, etc. Platform server 125 may provide some or all of the default workflow to anonymize stub server 110 as default configuration 350. Anonymize stub server 110 may forward default configuration 350 to user device 160. User device 160 may receive default configuration 350 and may present the default configuration via a second setup user interface (e.g., associated with setup application 310). FIG. 5 provides an exemplary user interface 500 that may correspond to the second setup user interface.

As shown in FIG. 5, user interface 500 may include an anonymize configuration map 510, a tools section 520, and a navigation section 530. Anonymize configuration map 510 may provide an interactive interface for a user to arrange an anonymization workflow (e.g., through proxy devices associated with service provider network 105). Tools section 520 may include building blocks for actions that may be included in configuration map 510, such proxy identifiers (e.g., "V-A#"), a new flow start (e.g., "1"), a reconstruction risk threshold (e.g., "RR"), connectors, endpoints, etc. Anonymize configuration map 510 may initially include a layout of default configuration 350 (e.g., as determined by platform sever 125). User interface 500 may permit a user of user device 160 to alter the default configuration using, for example, drag-and-drop techniques.

As further shown in FIG. 5, navigation section 530 may include a "back" option to return the user to a previous interface (e.g., user interface 400) and a "save" option. The save option may cause the configuration described by anonymization configuration map 510 to be saved locally for implementation and submitted to service provider network 105 (e.g., in an encrypted format). While certain anonymize configuration formats are provided in FIG. 5, in other implementations, user interface 500 may include different information, differently-arranged information, and/or additional information than depicted in FIG. 5.

Returning again to FIG. 3, a user may provide user input 360 (e.g., via user interface 500) to submit a user configuration 370 of anonymization procedures for user device 160. User configuration 370 may include, for example, a customized anonymize workflow (e.g., from anonymization configuration map 510). Anonymize stub server 110 may receive user configuration 370 and may submit user configuration 370 to platform server 125 for processing.

Platform server 125 may receive user configuration 370. Based on setup request 340 and user configuration 370, platform server 125 may set up a workflow to allow anonymization to be performed. For example, platform server 125 may set up a final instruction set including, for example, encryption/decryption schemes, the anonymize workflow, and trend tracking management for anonymization services for the particular user device 160. Platform server 125 may generate a stub update 380 with the final instruction set for anonymize server 110 and user device 160 to implement the scheme. Platform server 125 may provide stub update 380 to stub server 110, which, in turn, may forward stub update 380 to user device 160.

In one implementation, platform server 125 may also distribute anonymize process information to other devices in service provider network 105. For example, platform server 125 may provide eligibility information 330 (e.g., from setup request 340) to eligibility server 115 for verifying future requests from user device 160. Additionally, platform server 125 may provide user configuration 370 to request history server 135.

Although FIG. 3 shows exemplary components of network portion 300, in other implementations, network portion 300 may include fewer components, different components, differently-arranged components, and/or additional components than depicted in FIG. 3. Alternatively, or additionally, one or more components of network portion 300 may perform one or more other tasks described as being performed by one or more other components of network portion 300.

Figure 6:
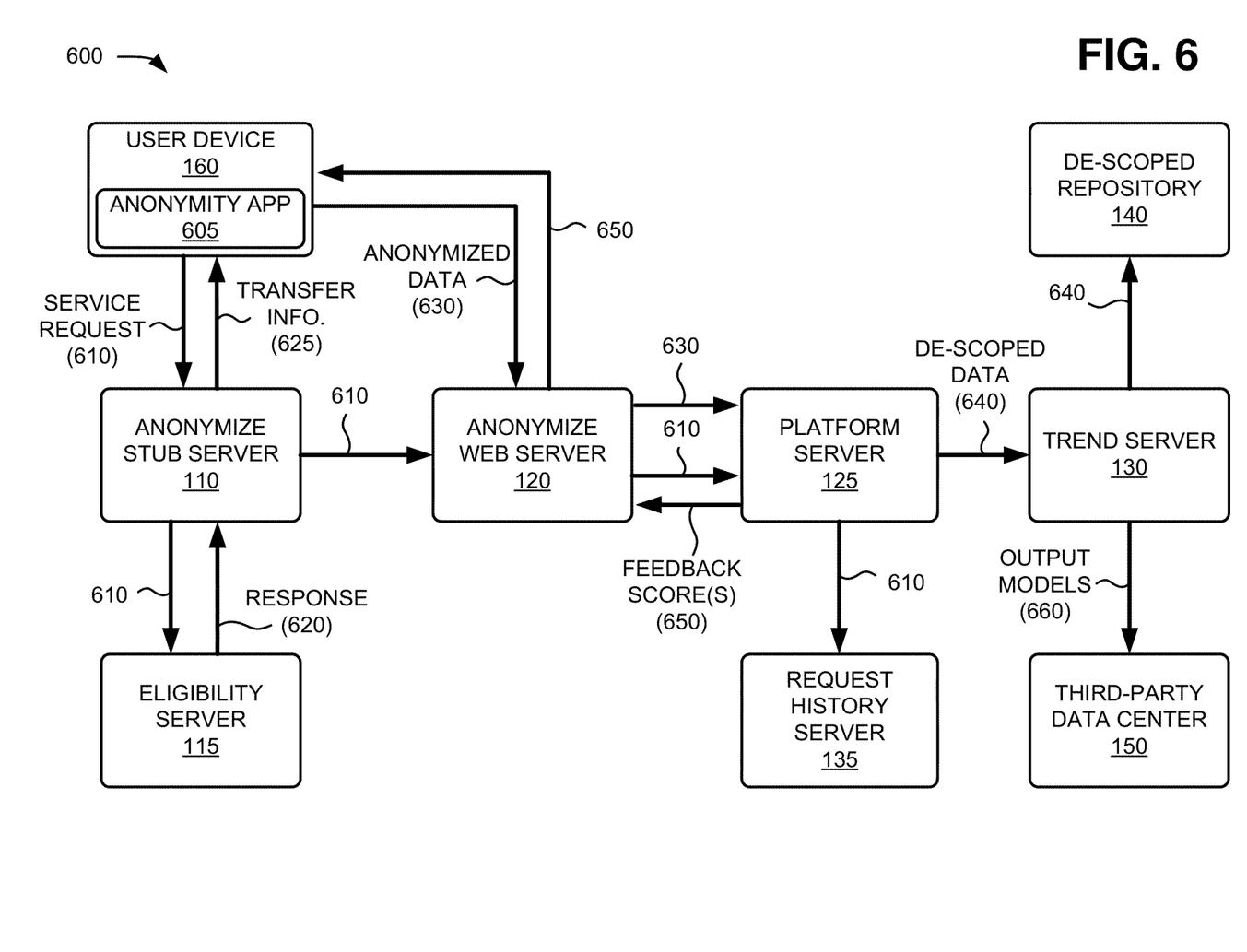
FIG. 6 is a diagram of exemplary communications between devices in another portion of the network of FIG. 1.

FIG. 6 is a diagram of exemplary communications for a portion 600 of network 100. Communications in FIG. 6 may represent communications to provide cumulative trend data from a user device 160 to third party data center 150. As shown in FIG. 6, network portion 600 may include anonymize stub server 110, eligibility server 115, anonymize web server 120, platform server 125, trend server 130, request history server 135, de-scoped repository 140, third party data center 150, and user device 160. Anonymize stub server 110, eligibility server 115, anonymize web server 120, platform server 125, trend server 130, request history server 135, de-scoped repository 140, third party data center 150, and user device 160 may include features described above in connection with, for example, FIGS. 1-5.

User device 160 may include an anonymity application 605 that may conduct anonymized data transfers for underlying data-generating applications. Anonymity application 605 may interface with the data generating applications via, for example, an API. As shown in FIG. 6, user device 160 may provide a service request 610 to anonymize stub server 110. Request 610 may include a request to perform an anonymized data transfer and an identifier (e.g., an MEID, a MAC address, a phone number, etc.) of user device 160. Anonymize stub server 110 may forward service request 610 to eligibility server 115 for authorization. Eligibility server 115 may, for example, compare information in service request 610 to information previously provided in eligibility information 330 (FIG. 3) to determine if user device 160 is authorized to receive anonymization services. Assuming user device 160 is eligible, eligibility server 115 may provide a response 620 to anonymize stub server 110 to permit an anonymized data transaction.

Anonymize stub server 110 may receive response 620 and may, in turn, transfer user device 160 to anonymize web server 120. For example, anonymize stub server 110 may provide transfer information 625 to user device 160. Transfer information 625 may include, for example, a URL or another link to permit user device 160 to connect to anonymize web server 120. Anonymize stub server 110 may also transfer request 610 to anonymize web server 120 for eventual storage by request history server 135 (e.g., in the event reconstruction is later required).

User device 160 may receive transfer information 625 and may use transfer information 625 to send encrypted, anonymized data 630 to anonymize web server 120. To generate anonymized data 630, user device 160 (e.g., anonymity application 605) may, for example, apply the anonymization workflow from stub update 380 (FIG. 3) to a data set generated from an underlying data-generating application (e.g., BP App, GO App, BW App, E-Mail, IM, etc.).

Anonymize web server 120 may receive service request 610 and anonymized data 630. Anonymize web server 120 may forward service request 610 to platform server 125. Platform server 125 may receive service request 610 and may provide service request 610 to request history server 135 so that all requests are maintained if reconstruction is required. Platform server 125 may also decrypt anonymized data 630, and may provide the decrypted, obfuscated data to trend server 130 as de-scoped data 640.

In one implementation, platform server 125 may also calculate and provide one or more session-specific feedback scores 650 regarding the data (e.g., anonymized data 630) received from user device 160. The feedback scores 650 may include a profile score that indicates a ranking (e.g., low/medium/high) of the relative level of anonymity of anonymized data 630. The feedback scores may also include a reconstruction risk score that relatively quantifies the information content in the data to the overall noise level in the collated data. Platform server 125 may provide feedback scores 650 to user device 160 via, for example, anonymize web server 120.

Trend server 130 may receive de-scoped data 640 and may add de-scoped data 640 to de-scoped repository 140. For example, de-scoped data 640 may be collated along with other anonymized observations (e.g., from other user devices 160 or from other sessions with the same user device 160). In one implementation, trend server 130 may generate/update output models 660 for third parties, such as third party data center 150. Output models 660 may include, for example, a Predictive Model Markup Language (PMML) model and/or situational real-time scoring. The model and/or scoring of output models 660 may be used by third party data center 150 without reliance on actual data that may be traceable to particular individuals.

Trend server 130 may manage de-scoped repository 140 and or model generation in any of a variety of methods. In one implementation, before adding de-scoped data 640 to de-scoped repository, trend server 130 may determine a delta perturbation and eligibility for dimensional reduction. For example, trend server 130 may perform principal component analysis (PCA) to understand if there is a statistically significant change based on the new data and/or if the number of random variables in the training set may be reduced. Trend server 130 may also perform a cross-validation (e.g., a k-fold validation) of any variance. If a particular dimension is deemed significant, trend server 130 may automatically add the dimension to the training set, rerun the analysis, and output the model to, for example, a PMML engine. The PMML engine may generate the PMML model for sharing with other PMML-compliant applications.

Although FIG. 6 shows exemplary components of network portion 600, in other implementations, network portion 600 may include fewer components, different components, differently-arranged components, and/or additional components than depicted in FIG. 6. Alternatively, or additionally, one or more components of network portion 600 may perform one or more other tasks described as being performed by one or more other components of network portion 600.

Figure 7:
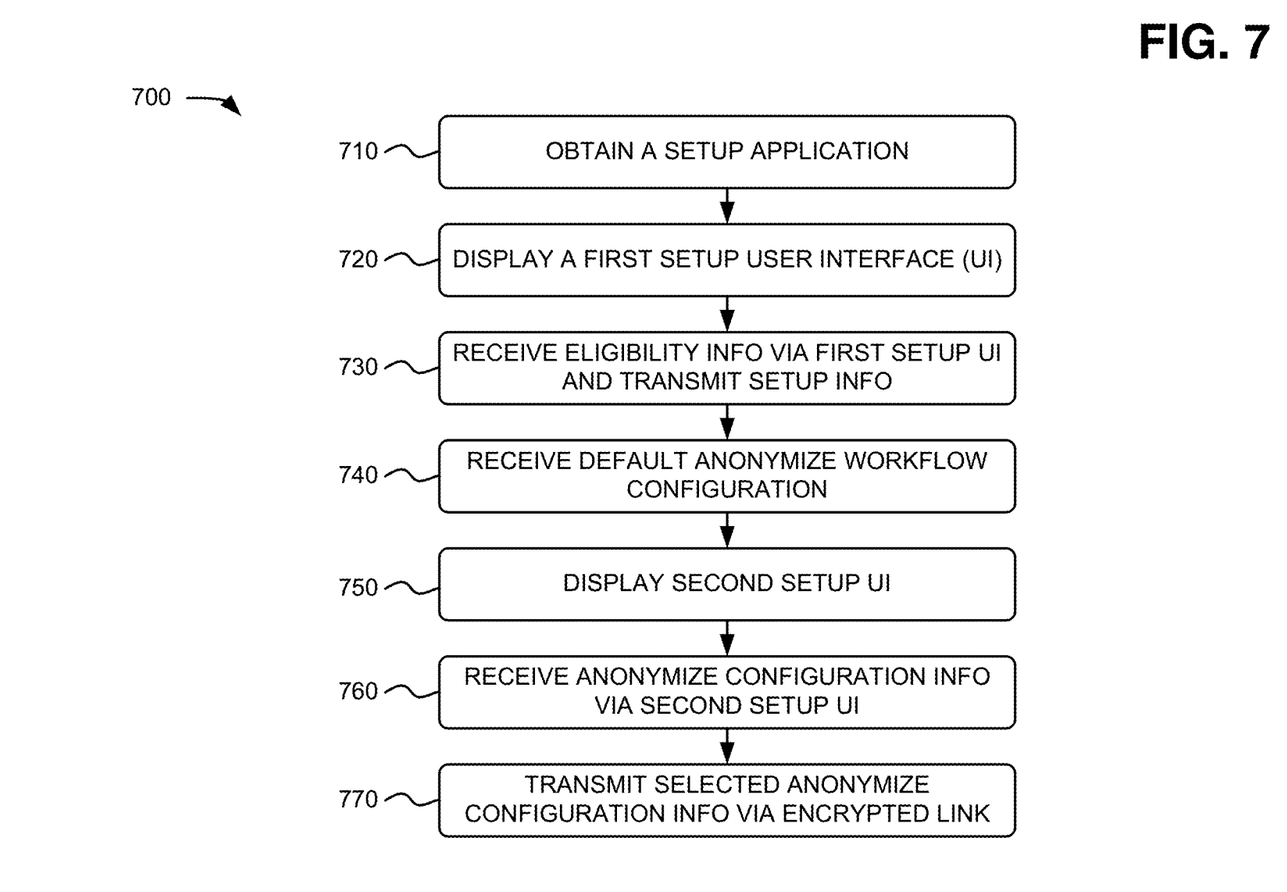
FIG. 7 is a flow diagram of an exemplary process for setting up a workflow to allow anonymization of data from a user device of FIG. 1 to be performed.

FIG. 7 is a flow diagram of an exemplary process 700 for setting up a workflow to allow anonymization of data from a user device of FIG. 1 to be performed. In one implementation, process 700 may be performed by user device 160. In another implementation, some or all of process 700 may be performed by another device or group of devices, including or excluding user device 160. For example, a device in service provider network 105 may perform one or more parts of process 700.

As shown in FIG. 7, process 700 may include obtaining a setup application (block 710) and displaying a first setup user interface (block 720). For example, as described above in connection with FIGS. 3 and 4, user device 160 may register with service provider network 105 and may receive a setup application (e.g., setup application 310). The setup application may include a first setup user interface (e.g., user interface 400) to solicit eligibility information for a user to use an anonymize interface with service provider network 105. The first setup user interface may also include, for example, particular encryption levels, risk levels, and/or types of data associated with the anonymization request.

Process 700 may further include receiving eligibility information via the first setup user interface and transmitting the setup information to an anonymization service provider (block 730). For example, as described above in connection with FIG. 3, user device 160 may receive user input into user interface 400 and may transmit setup information (e.g., eligibility information 330) that includes selected user settings, information from user device 160, and/or other eligibility information to anonymize stub server 110.

Process 700 may further include receiving a default anonymize workflow (block 740) and displaying a second setup user interface (block 750). For example, as described above in connection with FIGS. 3 and 5, anonymize stub server 110 may forward a default anonymize workflow (e.g., default configuration 350) to user device. User device 160 may receive default configuration 350 and may provide a second setup user interface (e.g., user interface 500) to solicit a customized workflow setup from the user.

Process 700 may also include receiving anonymization configuration information via the second user interface (block 760) and transmitting the anonymization configuration information via an encrypted link (block 770). For example, as described above in connection with FIGS. 3 and 5, a user may modify or accept the default anonymize configuration via user interface 500. The selected anonymize configuration may be stored locally and transmitted to provider network 105 (e.g., as user configuration 370) via an encrypted link (such as a HTTPS link) to establish a workflow for future transactions from user device 160.

Figure 8:
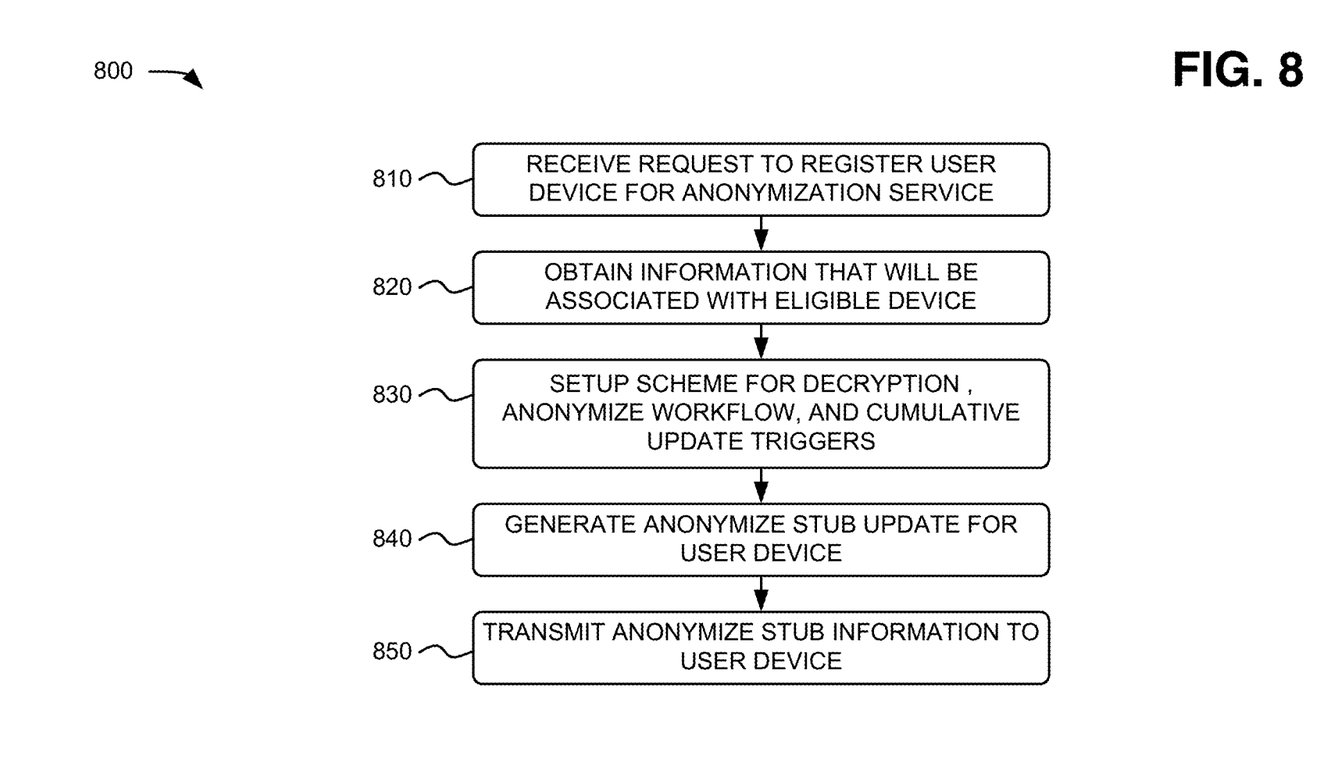
FIG. 8 is a flow diagram of an exemplary process for configuring a network device to receive anonymized data from the user device of FIG. 1.

FIG. 8 is a flow diagram of an exemplary process 800 for configuring a provider network to receive anonymized data from a user device. In one implementation, process 800 may be performed by platform server 125. In another implementation, some or all of process 800 may be performed by another device or group of devices, including or excluding platform server 125. For example, another device in service provider network 105 may perform one or more parts of process 800.

As shown in FIG. 8, process 800 may include receiving a request to register a user device for anonymization service (block 810) and obtaining information that will be associated with the user device (block 820). For example, as described above in connection with FIG. 3, platform server 125 may receive a registration request from user device 160 (e.g., via anonymize web server 120). Platform server 125 may collect custom and/or default configuration settings based on user input from first setup user interface 400 and second setup user interface 500.

Process 800 may also include setting up a scheme for decryption, anonymize workflow, and cumulative update triggers (block 830). For example, as described above in connection with FIG. 3, based on input from user device 160, platform server 125 may define categories into which anonymized data from user device 160 may be grouped (e.g., with data from other users). Categories may include, for example, demographic groups such as an age range, a regional location, a gender, etc. Platform server 125 may set up a scheme to decrypt anonymized data received from user device 160. The scheme may further identify particular relevant fields that may be selected from the decrypted, obfuscated data set. The scheme may also include instructions to provide the relevant data to trend server 130 associated with particular categories for user device 160.

Process 800 may also include generating an anonymize stub update for the user device (block 840) and transmitting the anonymize stub information to the user device (block 850). For example, as described above in connection with FIG. 3, platform server 125 may create anonymization functionality that will reside on user device 160. The anonymization functionality will be consistent with the decryption, workflow, and update scheme defined by platform server 125 (e.g., based on user input). Platform server 125 may provide stub information to user device 160 to implement anonymization in subsequent data transfers.

Figure 9:
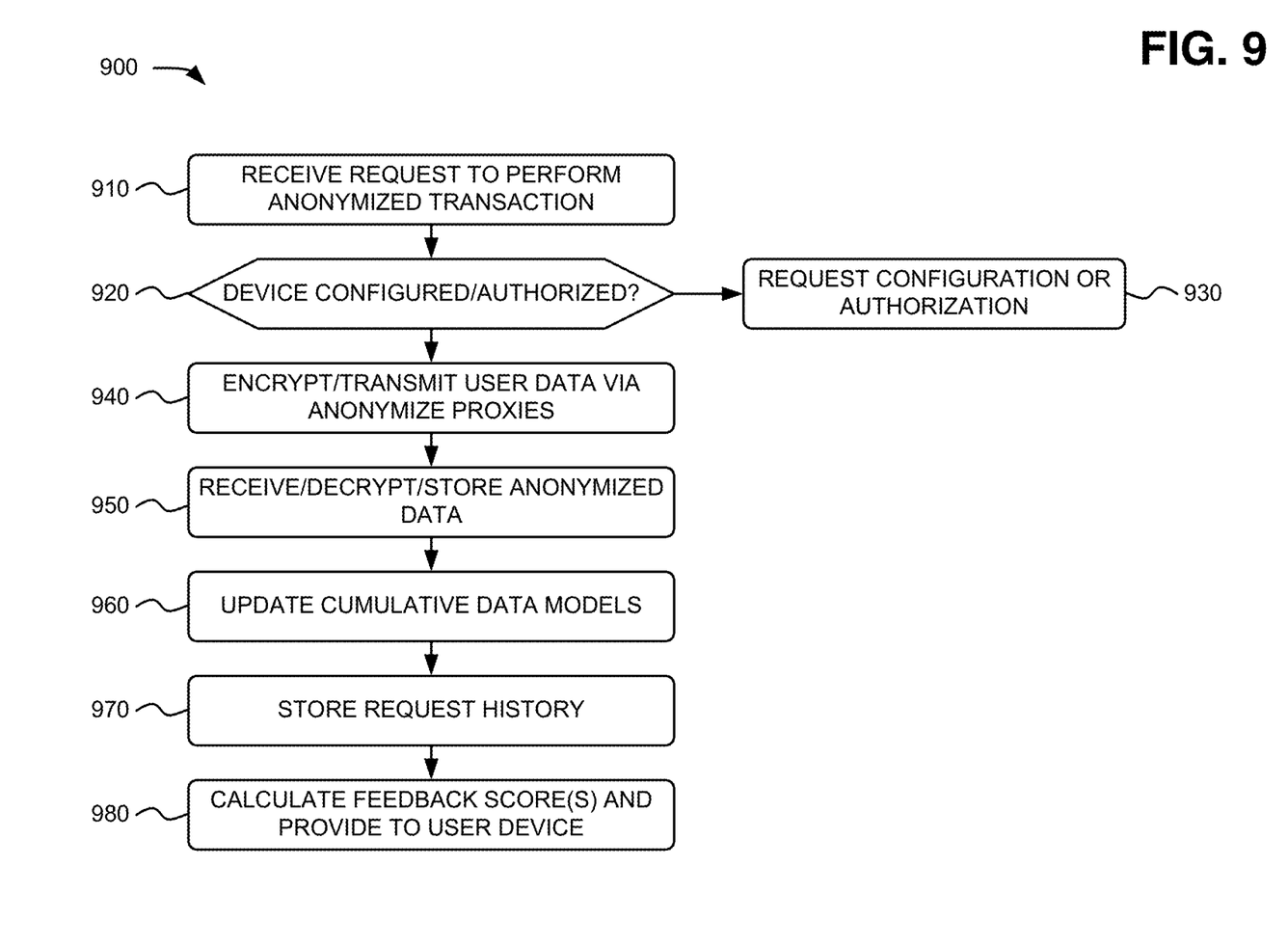
FIG. 9 is a flow diagram of an exemplary process for conducting an anonymized data transfer.

FIG. 9 is a flow diagram of an exemplary process 900 for conducting an anonymized data transfer. In one implementation, process 900 may be performed by user device 160 in conjunction with devices in service provider network 105. In another implementation, some or all of process 900 may be performed by another device or group of devices, such as third party data center 150.

As shown in FIG. 9, process 900 may include receiving a request to perform an anonymized transaction (block 910) and determining if the user device is configured and authorized to conduct the requested transaction (block 920). For example, as described above in connection with FIG. 6, an application residing on user device 160 may generate a request to perform an anonymized data transfer. In one implementation, user device 160 may communicate with stub server 110 to verify eligibility. In another implementation, user device 160 may confirm eligibility based on previous setup communications (e.g., stub update 380).

If the user device is not configured and authorized to conduct the requested transaction (block 920—NO), process 900 may include notifying a user that authorization and/or setup is required (block 930). For example, if user device 160 has not been registered at service provider network 105, service provider network 105 may send an activation code and an activation URL to user device 160. In response, the user of user device 160 may manually register user device 160 with service provider network 105 for use of anonymization services.

If the user device is configured and authorized to conduct the requested transaction (block 920—YES), process 900 may include encrypting and transmitting the obfuscated data from the originating device via anonymize proxy devices (block 940). For example, as described in connection with FIG. 6, user device 160 may provide encrypted data (e.g., anonymized data 630) to anonymize web server 120 in accordance with stub update 380.

Process 900 may further include receiving and decrypting anonymized data (block 950). For example, as described in connection with FIG. 6, platform server 125 may receive encrypted and obfuscated data (e.g., anonymized data 630) and may decrypt the data according to a previously arranged algorithm and further obfuscate user/device origin information. The decrypted data may be stored, for example, in de-scoped repository 140 in a cumulative, collated manner.

Process 900 may also include triggering a trend server to update predictive models (block 960). For example, as described in connection with FIG. 6, platform server 125 may provide obfuscated data (e.g., de-scoped data 640) to trend server 130 for trend server 130 to update PMML models and/or situational real-time scoring. The model and scoring outputs may be provided to or used by third party data center 150 without reliance on actual data that may be traceable to particular individuals.

Process 900 may also include storing a request history (block 970). For example, platform server 125 may store service request 610 with a time limit flag in request history 135. Time limit flag durations may be selected, for example, based on law enforcement, healthcare, or other industry standards. In another implementation, platform server 125 may check for authorization (e.g., from eligibility information 330 or user configuration 370) before storing the transaction data.

Process 900 may include calculating one or more feedback scores and providing the feedback scores to the user device (block 980). For example, platform server 125 may generate session-specific scores regarding the data received from user device 160 (e.g., anonymized data 630) or provided to trend server 130 (e.g., de-scoped data 640). In one implementation, the session-specific scores may include a profile score that indicates a ranking (e.g., low/medium/high) of the relative level of anonymity of the received data. Additionally, or alternatively, the session-specific scores may include a reconstruction risk score that relatively quantifies the information content in the data to the overall noise level in the collated data.

Systems and/or methods described herein may receive user criteria for providing anonymization of data from a user device, and generate a default workflow for achieving the user criteria. The systems and/or methods may provide, to the user device, the default workflow and may receive user input to the default workflow. The systems and/or methods may generate and send, based on the user input, final workflow instructions for transmitting data from the user device. The systems and/or methods may also receive data transmitted from the user device based on the final workflow instructions. In one implementation, the systems and/or methods may provide trend observations of anonymized data for use by third parties.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 7-9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method performed by one or more network devices, comprising:
  receiving, by one of the network devices, user criteria for providing anonymization of a plurality of user-identified types of data generated from a set of data-generating applications resident on a user device, wherein the user criteria includes an encryption level and a reconstruction risk level for different ones of the types of data;
  generating, by one of the network devices and based on the user criteria, a default workflow for achieving the user criteria;
  providing, by one of the network devices and to the user device, the default workflow;
  receiving, by one of the network devices, user input to the default workflow;
  generating, based on the user input, final workflow instructions for transmitting data from the user device;

sending, by one of the network devices and to the user device, the final workflow instructions;
receiving, by one of the network devices, anonymized data transmitted from the user device based on the final workflow instructions;
determining, by one of the network devices, multiple scores for the anonymized data, wherein the multiple scores include a profile score that indicates a qualitative ranking of a relative level of anonymity of the anonymized data, and a reconstruction risk score that relatively quantifies information content in the anonymized data to an overall noise level; and
sending, by one of the network devices, at least one of the profile score or the reconstruction risk score to the user device.

2. The method of claim 1, wherein the default workflow is configured to be presented on the user device via an interactive user interface.

3. The method of claim 1, wherein the user input includes one of accepting the default workflow or modifying the default work flow.

4. The method of claim 1, wherein the final workflow includes multiple anonymizing proxy devices to obfuscate origination from the user device.

5. The method of claim 1, further comprising:
receiving, from the user device, a request to conduct an anonymous data transaction, wherein the request includes a user device identifier;
authorizing the request; and
storing, in a memory, a record of the request.

6. The method of claim 1, further comprising:
storing, in a de-scoped repository of received data, the received data transmitted from the user device.

7. The method of claim 1, wherein the user input into the default workflow is provided in an encrypted format, and wherein the method further comprises:
decrypting the received user input.

8. The method of claim 1, wherein the final workflow instructions are configured to be accessed via an application program interface (API) residing on the user device.

9. The method of claim 6, further comprising:
identifying trends based on data in the de-scoped repository; and
providing, to a third-party device, access to the identified trends, wherein the access to the identified trends does not include access to the data in the de-scoped repository.

10. The method of claim 9, wherein providing access to the identified trends includes presenting one of a Predictive Model Markup Language (PMML) model or situational real-time scoring.

11. A system, comprising:
one or more first network devices configured to:
receive user criteria for providing anonymization of a plurality of user-identified types of data generated from a set of data-generating applications resident on a user device, wherein the user criteria includes:
a first encryption level and a first reconstruction risk level, selected by a user, for a first one of the data-generating applications, and
a second encryption level and a second reconstruction risk level, selected by the user, for a second one of the data-generating applications, wherein the first and second ones of the data-generating applications differ,
generate, based on the user criteria, a default workflow for achieving data anonymization according to the user criteria with respect to a first type of data generated from the first one of the data-generating applications and a second type of data generated from the second one of the data-generating applications,
provide, to the user device, the default workflow,
receive, from the user device, user input to the default workflow,
generate, based on the user input, final workflow instructions for anonymizing the first and second types of data and transmitting the anonymized data from the user device, and
send, to the user device, the final workflow instructions.

12. The system of claim 11, further comprising:
one or more second network devices configured to:
receive encrypted data transmitted from the user device based on the final workflow instructions, and
decrypt the encrypted data.

13. The system of claim 12, further comprising:
one or more third network devices configured to:
receive, from the user device, a request to conduct an anonymized data transaction, wherein the request includes a user device identifier,
verify eligibility of the user device based on the user device identifier, and
provide instructions for a session between the user device and the one or more second network devices to receive the encrypted data.

14. The system of claim 12, further comprising:
one or more fourth network devices configured to:
store the decrypted data in a de-scoped repository combined with other data, and
collate the combined data in the de-scoped repository as anonymized trend observations.

15. The system of claim 12, wherein the one or more second network devices are further configured to:
determine a reconstruction risk score and a relative level of anonymity for the received encrypted data, and
send, to the user device, at least one of the reconstruction risk score or the relative level of anonymity.

16. The system of claim 14, wherein the one or more fourth network devices are further configured to:
provide, to a third-party device, access to the trend observations, wherein the access to the trend observations does not include access to the decrypted data in the de-scoped repository.

17. A user device, comprising:
a network interface to communicate with one or more remote systems;
one or more memories to store instructions; and
one or more processors configured to execute instructions in the one or more memories to:
present a first user interface to receive eligibility information for the user device to conduct anonymized transactions with a service provider network, wherein the eligibility information includes:
a first reconstruction risk level for a first type of data, associated with first ones of the anonymized transactions, corresponding to a first set of data-generating applications resident on the user device,
a second reconstruction risk level for a second type of data, associated with second ones of the anonymized transactions, corresponding to a second set of data-generating applications resident on the user device, and
an encryption level for the first and second types of data associated with the first and second anonymized transactions, respectively receive, via the first user interface, the eligibility information, transmit the eligibility information to a network device associated with the service provider network, receive, from the network device, a default workflow configuration to conduct the first anonymized transactions with respect to a first type of data generated from the first set of data-generating applications and the second anonymized transactions with respect to a second type of data generated from the second set of data-generating applications, present a second user interface including the default workflow configuration, receive, via the second user interface, user input for the default workflow configuration to create an approved workflow configuration for the first and second anonymized transactions, transmit the approved workflow configuration to the network device, and receive, from the network device, an instruction set to implement the approved workflow configuration.

18. The user device of claim 17, wherein the eligibility information further includes:

a unique identifier for the user device.

19. The user device of claim 17, wherein the one or more processors configured to execute instructions in the one or more memories to:

encrypt data to be transferred using an anonymized transaction, and transmit the encrypted data based on the instruction set.

* * * * *